United States Patent Office 3,186,482
Patented June 1, 1965

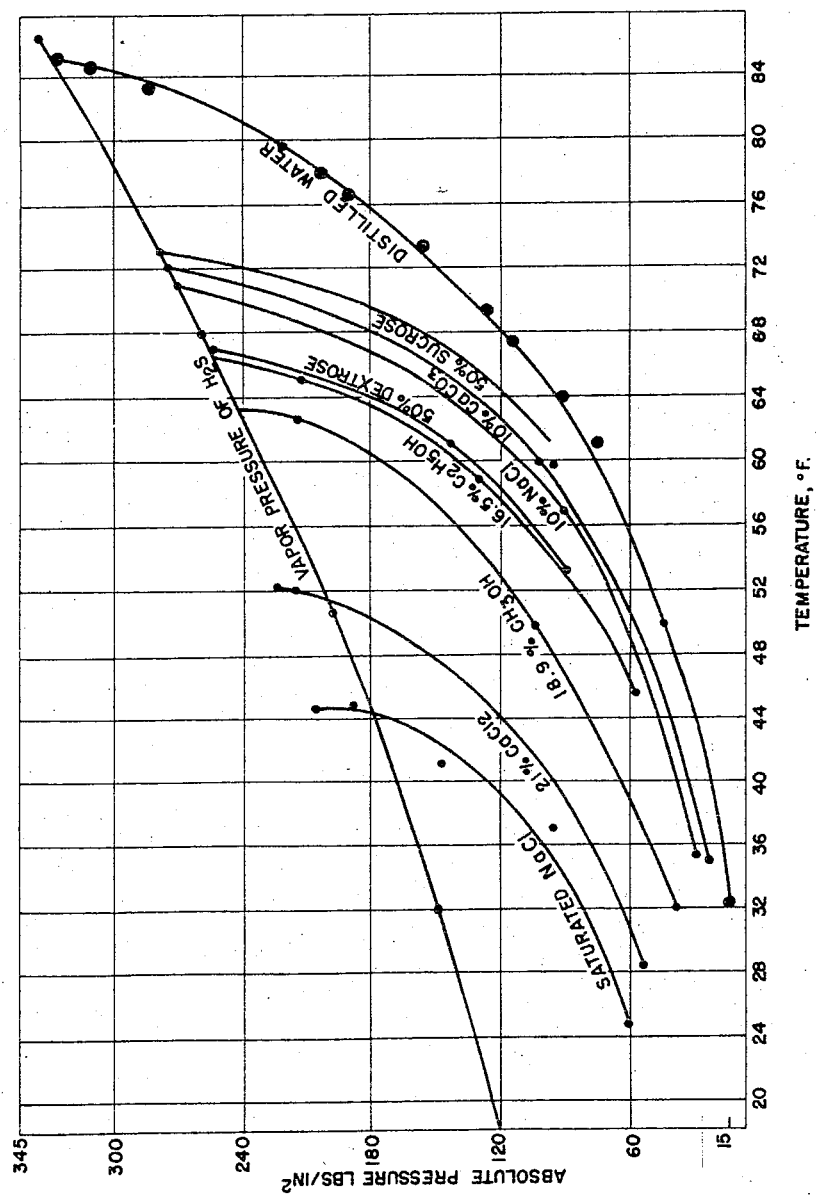
June 1, 1965     D. C. BOND     3,186,482
SECONDARY RECOVERY OF OIL
Filed July 23, 1962
INVENTOR.
DONALD C. BOND

3,186,482
SECONDARY RECOVERY OF OIL
Donald C. Bond, Crystal Lake, Ill., assignor to The Pure Oil Company, Chicago, Ill., a corporation of Ohio
Filed July 23, 1962, Ser. No. 211,661
7 Claims. (Cl. 166—9)

This invention relates to a method for increasing the recovery of oil from petroleum reservoirs. More specifically, this invention relates to a method for recovering petroleum from reservoirs in which injection and producing wells are effectively connected by thief zones of high permeability which render ineffective conventional solvent flooding.

The prior art recognizes that petroleum can be efficiently recovered from subterranean reservoirs, in which the natural drive force or pressure has been diminished or exhausted, by the injection of floodwater. Still greater oil recoveries can be obtained from exhausted reservoirs, or from reservoirs which have been treated by waterflood, by a process in which liquefied, normally-gaseous hydrocarbons, commonly referred to as LPG, are injected and driven through the reservoir by floodwater or gas. It has been found, however, that where the input and producing wells are effectively connected by thief zones or channels of high permeability, the effectiveness of such processes is greatly diminished. The liquefied solvent tends to enter the channels of high permeability, wherein it vaporizes and flows rapidly towards the producing wells. In some cases, up to 10% of the injected liquefied propane has been recovered at a producing well within a week of the time injection was begun. Such channeling is especially severe when the injection wells have been subjected to fracturing in an earlier stage of reservoir production.

It has now been found that thief channels can be shut off automatically through the controlled injection of hydrate-forming materials under proper conditions. In accordance with this invention, hydrogen sulfide, or mixtures of hydrogen sulfide with diluents such as propane, are injected. These materials are injected in small amount as a liquid, and followed by the injection of a generally larger slug of liquefied normally gaseous hydrocarbon which, in turn, is followed by the injection of a drive fluid, such as water or gas. The first injected hydrogen sulfide finds its way into the thief channels, where it vaporizes, cooling the hydrogen sulfide and the channel, and causes the hydrogen sulfide to form hydrate in combination with formation water. The solid hydrate effectively plugs the flow channel.

It is therefore a primary object of this invention to provide an improved secondary recovery process for the recovery of petroleum from reservoirs in which the injection and producing wells are effectively connected by thief zones of high permeability. Other objects of the invention will become apparent from the following description. It is usually desirable to test for the existence of troublesome flow channels by injecting a gas such as air into the input well in question. If the gas does not appear quickly at the nearby wells, it can be assumed that there are no channels which are large enough to cause difficulty. On the other hand, if a gas or air does appear very soon in nearby wells, steps must be taken to minimize the flow of any solvent that may be injected into that particular input well.

In carrying out the process of this invention, several cases need be considered. If the reservoir temperature is above about 86° F., the quadruple point for the formation of hydrogen sulfide hydrate, and if the interstitial water in the reservoir is relatively fresh, or the reservoir has been subjected to flooding by fresh water, then a slug of pure liquefied, hydrogen sulfide is injected into the well. As hydrogen sulfide flows through the channels between the injection well and the producing well, it vaporizes, thereby cooling the channel itself and forming solid hydrogen sulfide hydrate in the channel. This effectively seals the channel against any flow of either hydrogen sulfide or later injected solvent. Of course, after a while heat from the formation will flow into the channel and melt the hydrate so that it will decompose, hydrogen sulfide will move down the channel, further quantities of hydrogen sulfide will vaporize and cool, forming hydrate, and so forth along the length of the channel, so that there will be a continual block in the channel itself. Hydrogen sulfide which does not find its way into a thief channel will remain liquid until it approaches the producing well, and no hydrate will be formed in the major portion of the formation. Another possibility, when the temperature in the reservoir is above about 86° F., is that the formation will contain brine rather than fresh water. In this case, since the brine acts as anti-freeze and lowers the temperature of formation of $H_2S$ hydrate, it may be necessary to inject a slug of fresh water ahead of the hydrogen sulfide. The fresh water and hydrogen sulfide in the channel will form hydrate as described. Only a small amount of water need be injected, since it will preferentially seek out the channels of high permeability when injected, and be available for combination with the later injected hydrogen sulfide to form hydrate.

The drawing, which those skilled in the art will recognize as a plot of curves for various indicated solutions defining the inter-relationship of solid hydrogen sulfide hydrate formation in said solutions under specific conditions, illustrates the natural phenomena upon which this invention is based.

The amount of hydrogen sulfide to be injected in carrying out the process of this invention is small, usually in the range of about 0.001 to 0.020 reservoir pore volume. After the injection of hydrogen sulfide, 0.02 to 0.10 reservoir pore volume of liquefied, normally gaseous hydrocarbons, such as LPG or liquefied propane, is injected and driven toward the producing well by the injection of an inert drive fluid, such as water. Due to the limited amount of cooling available from the vaporization of injected liquid hydrogen sulfide, the hydrogen sulfide must be capable of forming hydrate in the presence of the water present in the formation at a temperature not more than about 20° below the prevailing reservoir temperature. Accordingly, the reservoirs subject to treatment in accordance with this invention are those having a temperature not in excess of about 106° F.

When the reservoir water contains more than about 2% total salts, the salt content thereof will act to a certain extent as an anti-freeze, lowering the temperature at which hydrate will form. Accordingly, where the reservoir water contains more than about 2% total salts, and the reservoir temperature is more than about 2° above the temperature at which hydrate will form when the formation water is contacted by hydrogen sulfide, it is preferred to inject about 0.001 to 0.010 reservoir pore volume of fresh water before injecting hydrogen sulfide.

If the formation temperature is below about 86° F., and the formation contains fresh water (either connate water or floodwater) there is danger that the injection of $H_2S$ in pure form will plug the formation completely and stop all further injection. In this situation, a mixture of hydrogen sulfide and propane, or hydrogen sulfide and butane, or other liquefiable normally gaseous hydrocarbon, is injected. The mixture will result in a lower hydrate-forming temperature than the pure hydrogen sulfide would display. The composition of the required mixture of hydrogen sulfide and propane can be roughly estimated from the graph shown in the drawing, employing the distilled water curve where the reservoir water is substantially fresh, and interpolating between the distilled water curve and one of the brine curves where the reservoir water contains salt. The approximate amount of hydrogen sulfide to be incorporated in admixture with liquefied, normally gaseous hydrocarbons can be roughly approximated by employing that amount of hydrogen sulfide which will produce a hydrogen sulfide partial pressure such that hydrate will form when the mixture is at a temperature in the range of about 2° to 20° below reservoir temperature considering the hydrogen sulfide partial pressure to be the pressure given by the curve of the drawing. Thus the partial pressure of the hydrogen sulfide will be such that hydrate will not form at reservoir temperature, but hydrate will form within the limits of the cooling which can be obtained by the vaporization of hydrogen in a thief zone. Accurate determinations of the proportions of hydrogen sulfide and hydrocarbon employed in the injected mixture can be made by means of the correlations developed by Noaker and Katz, and reported in the article "Gas Hydrates of Hydrogen Sulfide-Methane Mixtures," Journal of Petroleum Technology, volume 6, September 1954, pages 135 to 137. Briefly, the method used is to charge a test mixture of hydrogen sulfide and liquefied hydrocarbon, together with a small amount of water, into a transparent pressure vessel. The pressure vessel is disposed in a temperature bath and the mixture is cooled until hydrate forms. Then the vessel is warmed until the hydrate clinging to the surfaces of the vessel just begins to melt. This temperature is recorded as the hydrate formation temperature, and the pressure within the vessel is also recorded. It will be evident that by carrying out this experiment at a variety of pressures, a curve corresponding to those shown in the drawing can be obtained for any given mixture of hydrogen sulfide and hydrocarbon diluent, or hydrogen sulfide, hydrocarbon diluent, and anti-freeze.

In general, it is preferred not to employ mixtures of hydrocarbon and hydrogen sulfide wherein the hydrogen sulfide content is less than about 40% by volume, measured as a liquid. Where the reservoir temperature is so low that danger of immediate hydrate formation in the reservoir exists, even where 50–50 mixtures of hydrocarbon and hydrogen sulfide are employed, a small amount of an anti-freeze which is soluble in the hydrocarbon-hydrogen sulfide mixture, and also soluble in reservoir water, can be added to the hydrocarbon-hydrogen sulfide mixture before injection. Alternatively, any suitable anti-freeze, including water soluble salts, can be added to floodwater which is injected prior to the injection of hydrogen sulfide. Only a small amount of such floodwater, in the range of about 0.001 to 0.010 reservoir pore volume need be injected. In general, the amount of hydrogen sulfide-hydrocarbon mixture injected will be small, in the range of 0.001 to 0.02 reservoir pore volume.

As earlier discussed, the hydrogen sulfide will be followed by the injection of a suitable solvent, such as liquefied propane, in the amount of about 0.02 to 0.10 reservoir pore volume. The injected materials are driven towards the producing well by the injection of an inert fluid. Water is preferred as the inert fluid.

As a specific example of the method of this invention, a reservoir which is 900 ft. deep, has a temperature of 87° F., and which has been flooded with fresh water is tested by injecting air for 3 days at 500 p.s.i., and at the end of the third day air appears in an offset well 400 feet away. At this point liquefied hydrogen sulfide is injected through the injection well and into the formation to seal off the channels in the formation by the production of hydrogen sulfide hydrate. After 0.01 reservoir pore volume of hydrogen sulfide is injected, flow rates at injection pressure are found to decrease sharply, indicating that the thief channels have been plugged. Liquefied propane in the amount of 0.05 reservoir pore volume is then injected, and driven towards the producing wells by the injection of floodwater. Reservoir fluids are recovered from the producing wells in the usual manner. During the initial portion of the process it is unnecessary to maintain back pressure on the producing wells to maintain the injected propane as a liquid in the reservoir. At the terminal portion of the process some back pressure is maintained on the producing well.

As another example of the method of this invention, a reservoir having a temperature of 50° F. and which has been subjected to prior waterflood is treated by injecting a mixture comprising 60% $H_2S$, 35% propane and 5% methanol. About 0.01 reservoir pore volume of this mixture is injected, and followed by 0.07 reservoir pore volume of liquefied propane. Floodwater is then injected in the usual manner, all of the injection steps being carried out at a pressure in excess of the pressure required to maintain hydrogen sulfide and propane in liquid form at 50° F. Reservoir fluids are produced from the producing wells in the usual manner.

Although the process for plugging thief zones, as described above, is directed toward oil recovery processes that utilize propane or LPG, it can also be used where other petroleum solvents, such as hydrocarbon fractions, lower alcohols, lower ketones, or $CO_2$ are injected. Also, the plugging process can be used in cases where the solvent (e.g. propane) is to be followed by fluids other than water.

The embodiments of the invention in which an exclusive property or privilege is claimed are defined as follows.

I claim:

1. The method for recovering petroluem oil from a reservoir penetrated by an input well and an output well, wherein the reservoir temperature is in the range of 86° F. to 106° F., and said input and producing wells are effectively connected by a thief channel of high permeability, consisting essentially of injecting through said injection well and into said formation 0.001 to 0.020 reservoir pore volume of liquid hydrogen sulfide, then injecting through said input well into said formation 0.02 to 0.10 reservoir pore volume of petroleum solvent, then injecting an inert driving liquid to drive the injected materials towards said producing well, said injection steps occuring at a pressure sufficient to maintain hydrogen sulfide and said petroleum solvent as liquids at reservoir temperature, and recovering reservoir fluids from said producing well.

2. The method in accordance with claim 1 in which said petroleum solvent comprises liquefied, normally-gaseous hydrocarbons.

3. The method in accordance with claim 2 wherein a water phase in said reservoir contains in excess of 2% total salts, and a small amount of fresh water, sufficient to facilitate hydrate formation, is injected through said input well and into the formation prior to the injection of hydrogen sulfide.

4. The method in accordance with claim 3 in which said reservoir water is substantially fresh water and including as a first step the injection of 0.001 to 0.010 reservoir pore volume of water in which is incorporated a minor but effective amount of a water soluble anti-freeze.

5. The method of recovering petroleum from a reservoir penetrated by an input and a producing well, wherein the reservoir temperature is not in excess of 86° F. and said input and producing wells are effectively connected by a thief channel of high permeability, consisting essentially of injecting through said input well and into said formation 0.001 to 0.020 reservoir pore volume of a material consisting essentially of liquefied hydrogen sulfide and liquefied, normally-gaseous hydrocarbons, the proportions of the constituents of said material being selected such that said mixture will form hydrate in said thief channel in the presence of reservoir water at a temperature in the range of about 2° to 20° F. below reservoir temperature at injection pressure, then injecting 0.02 to 0.10 reservoir pore volume of petroleum solvent, then injecting an inert driving liquid to drive said injected materials towards said producing well, said injection steps occurring at a pressure sufficient to keep said material and said petroleum solvent liquid at reservoir temperature, and recovering reservoir fluids from said producing well.

6. The method in accordance with claim 5 in which said petroleum solvent comprises liquefied, normally-gaseous hydrocarbons.

7. The method in accordance with claim 5 in which said mixture includes a minor amount of an anti-freeze which is soluble in said mixture and in water.

References Cited by the Examiner
UNITED STATES PATENTS

| | | | |
|---|---|---|---|
| 2,010,409 | 8/35 | Muskat | 166—29 |
| 2,968,350 | 1/61 | Slobod et al. | 166—9 |
| 3,096,821 | 7/63 | Dyes | 166—9 |

CHARLES E. O'CONNELL, *Primary Examiner.*
BENJAMIN HERSH, *Examiner.*